United States Patent [19]
Taketoshi et al.

[11] Patent Number: 4,492,981
[45] Date of Patent: Jan. 8, 1985

[54] TV CAMERA TUBE

[75] Inventors: Kazuhisa Taketoshi; Chihaya Ogusu, both of Tokyo, Japan

[73] Assignee: Nippon Hoso Kyokai, Tokyo, Japan

[21] Appl. No.: 338,239

[22] Filed: Jan. 11, 1982

[30] Foreign Application Priority Data

Jan. 29, 1981 [JP] Japan ................................ 56-10848
Jan. 29, 1981 [JP] Japan ................................ 56-10850

[51] Int. Cl.[3] ......................... H04N 9/04; H01J 29/45
[52] U.S. Cl. .................................... 358/217; 358/219; 358/222; 313/366; 313/384; 313/387
[58] Field of Search .................. 358/70, 74, 217, 219, 358/222, 242, 243; 313/365, 366, 384, 385, 386, 387, 399

[56] References Cited

U.S. PATENT DOCUMENTS 2,733,292 1/1956 Cope .................................. 358/217
2,755,408 7/1956 Theile ................................. 358/217
2,972,072 2/1961 Lubszynski ......................... 313/365
3,096,395 7/1963 Gargini ................................ 358/70
3,887,827 6/1975 Katayama ........................... 313/366
4,025,814 5/1977 Schampers ......................... 313/386

FOREIGN PATENT DOCUMENTS 683603 12/1952 United Kingdom ............... 358/217

OTHER PUBLICATIONS

"Journal of the Institute of Television Engineers of Japan" vol. 19, No. 2, (1965) pp. 22-28.

*Primary Examiner*—Tommy P. Chin
*Attorney, Agent, or Firm*—Spencer & Frank

[57] ABSTRACT

A TV camera tube suitable for the HN system comprising a glass faceplate covered by an n-type transparent electrode layer consisting of Nesa glass on which a thin $p^+$-type layer, a p-type layer and an n-type layer are deposited in succession to form a photoconductive layer. A blocking layer is deposited on the photoconductive layer to form a protected photoconductive target. A metal mesh covered by an insulating material and a collector electrode for collecting secondary electrons emitted from the target are arranged on the electron beam scanning side of the target.

22 Claims, 28 Drawing Figures

PRIOR ART

PRIOR ART

TV CAMERA TUBE

BACKGROUND OF THE INVENTION

The present invention relates to a TV camera tube of the so-called HN type, that is, a high-electron-beam-velocity scanning and negative charging type, particularly, a photoconductive type TV camera tube having a metal mesh and a collector electrode arranged on the electron beam scanning side of a negative-charged photoconductive target and camera circuitry for deriving a camera output signal therefrom.

A TV camera tube of the HN type is disclosed by Miyashiro in "TV camera tube having a negative-charged target scanned by a high speed beam", Television, Vol. 19, No. 2, 1965, pp 96–102.

Comparing this TV camera tube of the HN type with the conventional LP type, namely, the low-electron-beam-velocity scanning and positive charging type, which has a positive-charged photoconductive target scanned by a low speed electron beam, the latter is operated at a low target voltage and a secondary electron emission ratio $\delta$ which is smaller than unity, namely, $\delta<1$, so that scanning electrons land directly on the target. In other words, the scanning beam gives a negative charge to the target. As a result, a current of electrons is circulated in a direction from a cathode to the cathode through the target and a signal electrode successively.

On the other hand, in the TV camera tube of the HN type, which is quite different from that of the LP type, the target is scanned at a high target voltage so that $\delta>1$. As a result, secondary electrons emitted from the target by the scanning beam are collected by a collector mesh electrode having a voltage applied thereto which is a few volts higher than that of the target. In this situation where $\delta>1$, the secondary electrons, which are more than the electrons of the scanning beam running into the target, are collected by the collector mesh electrode, so that the scanning beam gives a positive charge to the target. In other words, the current of electrons flows in a direction from the target to the signal electrode through the collector mesh electrode. Accordingly, the direction of the current of electrons flowing through the target is opposite to each other between the LP type and the HN type.

In connection therewith, it is confirmed that a TV camera tube of the HN type has the following advantages in comparison with that of the LP type.

(1) The capacitive discharge lag performance is better.

(2) The resolution performance is better.

(3) The energy of the scanning beam is higher, so that beam bending is scarcely caused.

Therefore, there is demand for the development of a target which is suitable for a camera tube of the HN type, in other words, which is hardly damaged by the high speed electron beam having high energy and is operated at a polarity opposite that scanned by the low speed electron beam. However, such a target has not yet been realized and how to manufacture it has not yet been determined, and further a suitable method for deriving a picture signal therefrom has not yet been investigated.

The above situation is based on such problems as the following:

(1) Problems due to the structures of the target and the camera tube

(a) Problem of high speed beam blocking

In a camera tube of the HN type, the energy of the high speed beam coming into the target is larger than that of the LP type. Hence, if use is made of a target having a polarity opposite to that of the LP type from a viewpoint of analogy to the LP type, the high speed beam penetrates through the target, and, as a result, the dark current is increased excessively so that this camera is not fit for use. Consequently, a target which has a high resistivity against the impact of a high speed beam is required.

(b) Problem of the shadow of the mesh collector

When the distance between the target and the mesh collector is increased to reduce the stray capacity between the target and ground, low speed secondary electrons emitted from a part of the target are deposited on the other part thereof, and, as a result, a spurious signal by redistribution is increased, so that the mesh collector must be arranged close to the target. Consequently, the stray capacity of the target is greatly increased. For instance, when the mesh collector is disposed adjacent to the target, the above stray capacity of a target of the one inch type amounts to 2000 pF. In addition, portions of the target which can not be scanned by the scanning beam, namely, portions corresponding to the so-called shadow of the mesh collector, are caused, so that the picture signal cannot be derived from those portions of the target.

(c) Problem of the blocking of electron injection from the faceplate side

A transparent nesa signal electrode formed of, for instance, $SnO_2$ has a strong n polarity. Accordingly, when a target polarity which is simply opposite to that of a target used for low speed beam scanning is formed on a surface of this Nesa electrode, by for instance, reversing the order of the layer structures, electrons are injected into the target from the signal electrode and, as a result, the dark current is increased. Thus, a layer structure is required in which the electron injection is obstructed.

(2) Problems relating to signal derivation

The signal derivation from a camera tube of the NH type has been tried in the following three modes, which will be described hereinafter regarding difficulties caused by those conventional modes of signal derivation.

(a) T mode

For deriving the picture signal from the target similarly to the conventional LP type, a preamplifier is arranged between the signal electrode and the target voltage source. In this T mode, it is required for reducing the spurious signal by redistribution to extremely narrow the distance between the target and the mesh collector. Accordingly, as mentioned above, the stray capacity of the target is extremely increased, so that it amounts usually to 2000 pF. This stray capacity is coupled in parallel with the preamplifier, so that the resolution and the SN ratio are extremely lowered.

(b) M mode

For deriving the picture signal from the mesh collector, the preamplifier is connected between the mesh collector and a connection point of the target voltage source and the collector voltage source. In this M mode, the following defects are added to the above-mentioned defects of the T mode. That is, the current flowing into the mesh collector in response to the beam scanning, which amounts usually to 1 μA, is added to the signal current, so that the beam noise caused by the ineffectual beam having no relation to the signal is increased.

(c) RB mode

Similarly as the return beam mode in a camera tube of the LP type, secondary electrons passing through the mesh electrode are collected by the collector electrode arranged between the mesh electrode and the cathode, and then the signal corresponding to those electrons collected by the collector electrode is derived by the preamplifier arranged between the collector electrode and the connection point of the mesh voltage source and the collector voltage source. The mesh electrode is provided for keeping the balance of the beam scanning side surface potential of the target, so that it will be called a balancing mesh hereinafter, and the simple description of "mesh" will mean this balancing mesh. Moreover, the above described collector electrode means all of such electrodes as can be practically formed by applying a voltage which is a little higher than the mesh voltage to those electrodes which are usually called the "$G_3$ electrode" or "$G_2$ electrode" and used for focusing or accelerating the electron beam. In this RB mode, the signal is derived from the collector electrode, so that the large stray capacity between the mesh and the target is allowable. However, this RB mode has also a defect in that secondary electrons passing through the mesh are deposited thereon and the amount of those deposited electrons corresponds nearly to the light transparency, that is, about 50 percent, and, as a result, the signal current is decreased. Moreover, other secondary electrons, which are emitted from the mesh with no relation to the signal, are added to those secondary electrons which are emitted from the target and hence correspond to the signal, whereby the beam noise is increased.

In the RB mode of a camera tube of the HN type, which is quite different from that of the camera tube of the LP type, the potential of the surface of the target, which surface is exposed to the beam scanning is nearly equal to that of the mesh and further the space distance between the target and the mesh is also extremely close, so that it is almost impossible to separate those secondary electrons emitted from the mesh from the secondary electrons emitted from the target.

SUMMARY OF THE INVENTION

An object of the present invention is to provide a TV camera tube having a target structure and such a mesh structure of the HN type which can be applied for practical use as a result of resolving the aforesaid problems.

In order to attain the above object, according to the present invention, a TV camera tube is provided which comprises an n-type transparent signal electrode layer consisting, for instance, of nesa glass which layer is deposited on a glass face plate, a target formed of a photoconductive layer disposed on the above signal electrode layer by depositing a thin $p^+$-type layer, a p-type layer and an n-type layer thereon in order and a block layer deposited on the photoconductive layer and further a metal mesh and a collector electrode arranged on the beam scanning side of the target.

It is preferable for the above structure that the block layer consists of ZnTe or CdTe with 20–2000 Å thickness, and that the resistivity thereof is selected between $10^8$ and 10 Ωcm.

Further, it is also preferable to deposit an insulation film having a predetermined thickness on at least one of the block layer and the metal mesh, so as to provide a space therebetween. SiO, $MgF_2$, $Y_2O_3$ and the like are suitable materials for the insulation film and 0.5–5 μm is suitable for the predetermined thickness.

The metal mesh is covered with an insulation material on the block layer side thereof, so as to facilitate collection of the secondary electrons emitted from the target by the collector electrode without capture by the metal mesh. This insulated metal mesh can be disposed close or adjacent to the block layer of the target. It is preferable to use SiO, $MgF_2$ or $Y_2O_3$ for the insulation material covering the metal mesh and to select the thickness thereof in a range from 1000 Å to 5 μm. Further, it is also preferable to deposit an Au film having a thickness in a range of 30–300 Å on the beam scanning side of the metal mesh, so as to prevent the irregular variation of the potential of the metal mesh in response to the variation of the position thereof.

In addition thereto, according to the present invention, the collector electrode is formed of a $G_4$ electrode, a mesh rack is disposed on the $G_4$ electrode and covered by a Teflon ring having a skirt, the metal mesh is disposed on this Teflon ring, an indium ring is disposed on an opening end of a glass envelope of the camera tube, an edge portion of the glass faceplate of the structure consisting of the glass faceplate, the n-type transparent electrode and the photoconductive target is disposed on the indium ring, a faceplate holder is disposed on the glass faceplate through a conductive gum sheet, the glass envelope is vacuum-sealed by means of crushing the indium ring by pushing the glass faceplate from the faceplate holder side toward the metal mesh side thereof and, as a result thereof, an inner surface of the crushed indium ring is brought into contact with the metal mesh.

As mentioned above, according to the present invention, for the purpose that the target can endure the impact of the electron beam, the target is provided with the block layer, as well as the photoconductive layer proper is formed in the p-n structure having the reverse polarity to the conventional structure. As a result, the electron beam coming into the surface of the block layer at high speed makes secondary electrons emitted therefrom and then goes toward the photoconductive layer. Consequently, the block layer converts the energy of the high speed beam into thermal energy, which is conducted to the glass faceplate from the photoconductive layer to the transparent signal electrode layer without harming the target and is radiated outside thereof. The velocity of the incoming electron beam decreases to zero when it arrives at the surface of the photoconductive layer through the block layer.

It is preferable for operating the camera tube of the present invention that the target is operated according to the HN system and the output signal is derived in response to the secondary electron emission therefrom. However, it is required to form the block layer of such a material as sufficient secondary electrons can be emitted therefrom and a high heat conductivity can be obtained.

According to the present invention, in order to reduce the spurious signal by redistribution, the target and the metal mesh are disposed close to each other, so that the stray capacitance is increased. However, the lowered SN ratio resulting therefrom cannot be improved structurally, so that it is necessary to derive the signal appropriately to prevent the SN ratio from being lowered.

Besides, in order to resolve the aforesaid problem of the shadow of the metal mesh, a current is caused also in portions of the block layer which portions are shadowed by the metal mesh by the leakage based on the appropriately selected resistance of the block layer, so as to derive signal components in response to secondary electrons emitted from the above shadowed portions of the block layer.

According to the present invention, the photoconductive layer has a layer structure of reverse polarity to that of the conventional photoconductive layer, so that the $p^+$-type transparent signal electrode, instead of the conventional n-type transparent electrode, that is, the so-called nesa film, can be deposited on the glass faceplate. However, no appropriate $p^+$-type transparent electrode has yet been developed, so that, according to the present invention, the conventional n-type nesa film is employed for the transparent electrode, and further a $p^+$-type thin layer is arranged between the nesa film and the photoconductive layer. This layer structure according to the present invention can be realized by the manufacturing method disclosed in U.S. Pat. No. 4,352,834.

In addition thereto, another object of the present invention is to provide a TV camera tube circuit for deriving a picture output from a TV camera tube of the HN type as a result of resolving the aforesaid problems.

As mentioned eariler, regarding the T mode, when the distance between the target and the metal mesh is short in order to reduce the spurious signal by redistribution, the extreme decrease of the resolution and the SN ratio, whilst, regarding the RB mode, although such an increased stray capacitance as mentioned above is allowable, as other defects, the loss of the signal current is increased, and hence the beam noise is also increased, and further two kinds of secondary electrons emitted respectively from the metal mesh and the target cannot be separated.

In order to resolve the above mentioned problems, according to the present invention, the derivation of the picture signal from a camera tube of the HN type having an extremely short distance between the target and the metal mesh as mentioned above is effected by a combination of the T mode and the RB mode, so as to cancel the above-mentioned respective defects thereof.

For the above, in the camera tube circuit according to the present invention, the transparent signal electrode is connected with the preamplifier, as well as to a negative terminal of the target voltage source, a capacitor is externally connected between the target and the metal mesh, so as to maintain the potential of the metal mesh at a constant amount, and the metal mesh is connected with a positive terminal of the target voltage source through a series circuit of a resistor having a resistance which is sufficiently larger than the input impedance of the preamplifier and a switch which is opened only at the blanking periods of the beam scanning, whereby the target is negatively charged and hence the output signal can be derived from the preamplifier by scanning the target with the high speed electron beam obtained from the cathode.

In the above circuit arrangement, the switch is formed of a field effect transistor, a MOS type field effect transistor or a vacuum tube, a control electrode of which is applied with blanking pulses, so as to open the switch only at blanking periods. It can be formed also of a capacitor having a large capacitance and a diode, the polarity of which is so selected that a discharge current from the capacitor can be obstructed at the blanking period. In a preferred embodiment of the present invention, a discharge obstructing voltage source supplying a voltage which is equal to the voltage drop of the above described high resistance resistor which drop is caused by a mesh current flowing through the high resistance resistor during the beam scanning, and a switch, which is opened only at the blanking period, are connected to each other so as to form a series circuit, which is connected in parallel with another resistor having a sufficiently lower resistance than that of the above high resistance resistor so as to form a parallel circuit, which is connected between the above high resistance resistor and the positive terminal of the target voltage source, and the polarity of the discharge obstructing voltage source is selected so that the discharge current from the capacitor is obstructed at the blanking period.

BRIEF DESCRIPTION OF THE DRAWINGS

For the better understanding of the invention, reference is made to the accompanying drawings, in which.

DETAILED DESCRIPTION OF THE PREFERRED EMBODIMENTS

As mentioned eariler, it has been confirmed that a TV camera tube of the HN type has various advantages in comparison with that of the LP type. However, various problems regarding the structure of the target and others and regarding the signal derivation thereof remain, and hence a target suitable for the HN system has not yet been realized nor has a manufacturing method been established. Further, no signal derivation suitable for the HN system has as yet been sufficiently developed.

First, the differences between a camera tube of the NH type and that of the LP type will be described hereinafter by referring to FIGS. 1 and 2.

Figure 1:
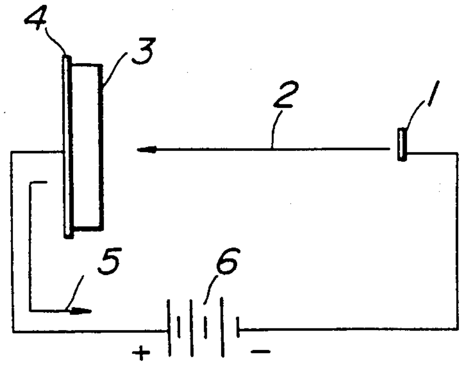
FIG. 1 is a circuit diagram showing an outline of a conventional TV camera tube of the LP type.

In a camera tube of the LP type as shown in FIG. 1, 1 is a cathode, 2 is a scanning beam injected from the cathode toward a target 3, 4 is an nesa transparent signal electrode consisting, for instance, of $SnO_2$, which is deposited on the target 3, 5 is an electron current derived from the signal electrode 4, and 6 is a target voltage source applying a positive voltage to the target 3. In the LP system, the target voltage is lowered, and hence the target 3 is operated with a secondary electron emission ratio $\delta$ which is less than unity, namely, $\delta<1$, so that electrons of the scanning beam 2 land directly on the target 3, and hence the scanning beam 2 gives negative charges to the target 3. Accordingly, as shown in FIG. 1, electrons flow in a direction from cathode 1 to the cathode 1 through target 3 and the signal electrode 4 in this sequence.

Figure 2:
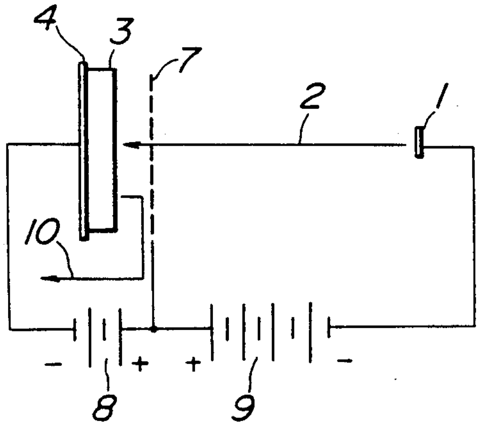
PRIOR ART FIG. 2
FIG. 2 is a circuit diagram showing an outline of a conventional TV camera tube of the HN type.

On the other hand, in a camera tube of the HN type as shown in FIG. 2, a collector electrode 7 formed of a mesh or the like, which is called a collector mesh, is arranged between the cathode 1 and the target 3, and, a target voltage source 8 applying a negative voltage to the target 3 is connected between the signal electrode 4 and the collector electrode 7, as well as a collector voltage source 9 applying a positive voltage to the collector electrode 7 is connected between the cathode 1 and the collector electrode 7. In the HN system, which is quite different from the LP system, the target 3 is scanned under the target voltage which is increased enough to make $\delta>1$. As a result, the secondary electrons emitted from the target 3 by the scanning beam 2 are collected by the collector electrode 7 which is applied with a voltage that is a few volts higher than that of the target 3. In this situation, $\delta>1$, so that secondary electrons, which are more than those of the primary scanning beam 2 impacting the target 3, are collected by the collector mesh 7, and, as a result, the scanning beam 2 gives positive charges to the target 3. Accordingly, electrons flow in a direction from the target 3 to the signal electrode 4 through the collector mesh 7 as shown by an arrow mark 10 in FIG. 2, and hence, as is apparent from that comparison with FIG. 1, the directions in which the electrons pass through the target 3 are opposite to each other in the LP type camera tubes and the HN type.

It is confirmed that a TV camera tube of the HN type has the following advantages in comparison with that of the LP type:

(1) The capacitive discharge lag performance is better.

(2) The resolution performance is better.

(3) The energy of the scanning beam is higher, so that beam bending is scarcely caused.

Therefore, there is a demand for the development of a target which is suitable for the camera tube of the HN type, in other words, which is hardly damaged by a high speed electron beam having high energy and which is operated at the opposite polarity from that scanned by the low speed electron beam. However, such a target has not yet been realized and how to manufacture it has not yet been determined, and further a suitable method for deriving a picture signal therefrom has not yet been investigated.

The above situation is based on such problems as the following:

(1) Problems due to the structures of the target and the camera tube

(a) Problem of high speed beam blocking

In a camera tube of the HN type, the energy of the high speed beam 2 coming into the target 3 is larger than that of beam in the LP type, so that, when the target 3 is operated at the opposite polarity to that of the LP type on a simple analogy thereof, the high speed beam 2 penetrates through the target 3, and, as a result, the dark current is increased excessively so that it is not fit for use. Consequently, a target which has a high resistivity against the impact of the high speed beam is required.

(b) Problem of the shadow of the mesh collector

When the distance between the target 3 and the mesh collector 7 is increased to reduce the stray capacity between the target 3 and ground, low speed secondary electrons emitted from a part of the target 3 are deposited on the other part thereof, and, as a result, a spurious signal by redistribution is increased, so that the mesh collector 7 must be arranged close to the target 3. Consequently, the stray capacitance of the target 3 is greatly increased. For instance, when the mesh collector 7 is disposed adjacent to the target 3, the stray capacitance of the target 3 of the one inch amounts to 2000 pF. In addition, portions of the target 3 which portions can not be scanned by the scanning beam, namely, portions corresponding to the so-called shadow of the mesh collector 7, are caused, so that the picture signal cannot be derived from those portions of the target 3.

(c) Problem of the blocking of electron injection from the faceplate side

A transparent Nesa signal electrode 4 formed of, for instance, $SnO_2$ has a strong n polarity. Accordingly, when a target having a polarity which is simply opposite to that used for low speed beam scanning is formed on a surface of this Nesa electrode 4, for instance, the order of those layer structures is reversed, electrons are injected into the target 3, and, as a result, the dark current is increased. Thus, a layer structure for blocking the electron injection is required.

(2) Problems relating to the signal derivation

The signal derivation from a camera tube of the HN type has been tried in the following three modes, which will be described hereinafter regarding difficulties caused by those conventional modes of signal derivation by referring to FIGS. 3 to 5.

(a) T mode

Figure 3:
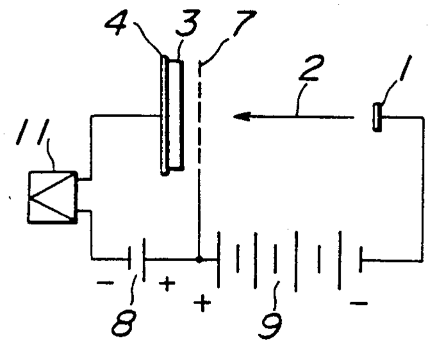
FIGS. 3 to 5 are circuit diagrams showing respectively various modes of signal derivation of a conventional TV camera tube of the HN type.

For deriving the picture signal from the target 3 in a manner similar to that for the conventional LP type, as shown in FIG. 3, a preamplifier 11 is arranged between the signal electrode 4 and the target voltage source 8. In this T mode, it is required for reducing the spurious signal by redistribution to extremely narrow the distance between the target 3 and the mesh collector 7. Accordingly, as mentioned above, the stray capacitance of the target 3 is extremely increased, so that it amounts usually to 2000 pF. This stray capacitance is coupled in parallel with the preamplifier 11, so that the resolution and the SN ratio are extremely lowered.

(b) M mode

Figure 4:
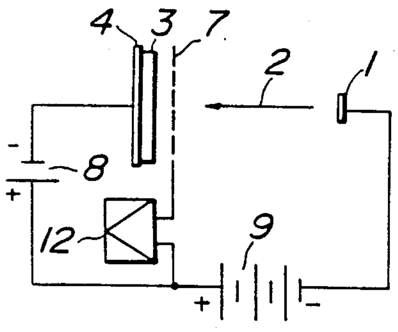
PRIOR ART FIG. 4

For deriving the picture signal from the mesh collector 7, as shown in FIG. 4, a preamplifier 12 is connected between the mesh collector 7 and a connection point of the voltage sources 8 and 9. In this M mode, the following defects are added to the above-mentioned defects of the T mode. That is, the current flowing into the mesh collector 7 in response to the beam scanning, which amounts usually to 1 $\mu$A, is added to the signal current, so that the beam noise caused by the ineffectual beam having no relation to the signal is increased.

(c) RB mode

Figure 5:
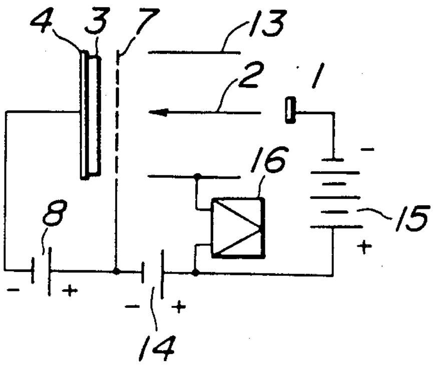
PRIOR ART FIG. 5

Similarly to the return beam mode in a camera tube of the LP type, as shown in FIG. 5, secondary electrons passing through the mesh electrode 7 are collected by a collector electrode 13 arranged between the mesh electrode 7 and the cathode 1, and then the signal corresponding to those electrons collected by the collector electrode 13 is derived by a preamplifier 16 arranged between the collector electrode 13 and a connection point of a mesh voltage source 14 and a collector voltage source 15. The mesh electrode 7 is provided for keeping the balance of the beam scanning side surface potential of the target 3, so that it is called a balancing mesh, and the simple description of "mesh" means this balancing mesh, as mentioned earlier. Moreover, the above described collector electrode means all such electrodes that can be practically formed by applying a voltage which is a little higher than the mesh voltage to those electrodes which are usually called "$G_3$ electrode" or "$G_2$ electrode" and used for focusing or accelerating the electron beam.

In this RB mode, the signal is derived from the collector electrode 13, so that the large stray capacitance between the mesh 7 and the target 3 is allowable. However, this RB mode also has a defect in that secondary electrons passing through the mesh 7 are deposited thereon and the amount of those deposited electrons corresponds nearly to the light transparency, that is, about 50 percent and, as a result, the signal current is decreased. Moreover, other secondary electrons, which are emitted from the mesh 7 with no relation to the signal, are added to those secondary electrons which are emitted from the target 3 and hence correspond to the signal, whereby the beam noise is increased.

In the RB mode of a camera tube of the HN type, which is quite different from that of the camera tube of LP type, the potential of the surface of the target 3, which surface is exposed to the scanning beam 2 is nearly equal to that of the mesh 7 and further the space distance between the target 3 and the mesh 7 is also extremely close, so that it is almost impossible to separate those secondary electrons emitted from the mesh 7 from the secondary electrons emitted from the target 3.

Figure 6:
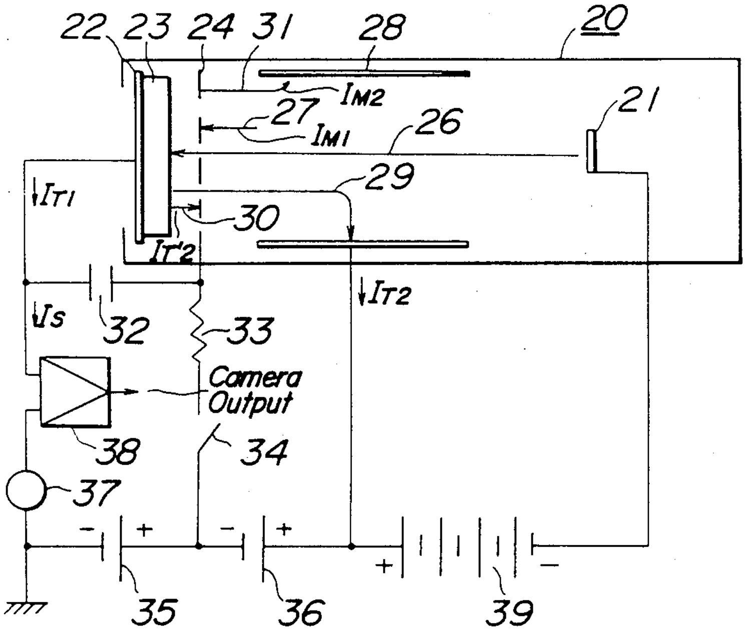
FIG. 6 is a circuit diagram showing an outline and a mode of signal derivation of a TV camera tube according to the present invention.

The TV camera tube according to the present invention is provided with a target structure and a mesh structure as in the HN system which can be applied for practical use by resolving the above-mentioned problems. FIG. 6 shows the basic configuration of the TV camera tube according to the present invention together with circuitry for deriving the output signal and driving the camera tube.

In FIG. 6, 20 denotes the entire camera tube structure, 21 is a cathode, 22 is a signal deriving electrode consisting of a transparent electrode formed, for instance, of a nesa film, 23 is a target formed on the transparent electrode 22, and 24 is a metal mesh arranged close or adjacent to the target 23 so as to prevent the generation of a redistributed spurious signal.

Figure 7:
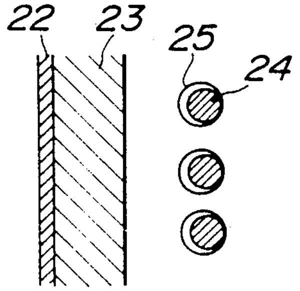
FIG. 7 is an enlarged cross-sectional view showing partially a target and a mesh of the TV camera tube according to the present invention.

As shown in FIG. 7, the metal mesh 24 is covered by an insulation material 25 deposited on a side thereof facing the target 23, so as to prevent an electrical connection between the metal mesh 24 and the target 23. The surface of the metal mesh 24 on the opposite side facing the cathode 21 is not covered by the insulation material 25, so as to maintain the mesh potential at a substantially constant level by injecting a part 27 of the electron beam 26 into the metal mesh 24 during beam scanning. A collector electrode 28 is arranged between the metal mesh 24 and the cathode 21, so as to collect secondary electrons 29 emitted from the target 23 by the scanning beam 26. The major part of the secondary electrons 29 passes through the metal mesh 24 and then is collected by the collector electrode 28, whilst the minor part 30 thereof is collected by the metal mesh 24. On the other hand, secondary electrons 31 emitted from the metal mesh 24 by the injected primary scanning beam 27 are collected also by the collector electrode 28. The collector electrode 28 can be used in common for the beam collecting electrode, the beam accelerating electrode and the like, which are usually called $G_4$, $G_3$ and $G_2$, respectively, for instance, when an electron gun available on the market is utilized. In this configuration of the camera tube, the metal mesh 24 and the collector electrode 28 are insulated from each other in the camera tube 20, as well as the metal mesh 24 and the target 23 are insulated also in the camera tube 20.

Next, the detailed layer structure of the target comprising the camera tube of the present invention will be described by referring to FIG. 8.

The target according to the present invention can be formed substantially of arbitrary material so long as it is provided with a layer structure having a reverse polarity in comparison with that of the a camera tube of LP type. However, in a camera tube of the HN type, which is quite different from that of the LP type, the target is always impacted by a high energy electron beam, so that it is preferable to form the target of such material as can withstand an electron beam impact such as semiconductors consisting of compounds of groups II and IV, for instance, CdTe-CdS. Accordingly, a target of the HN type can be formed by depositing CdTe and CdS in that order on a transparent electrode consisting of a Nesa film or the like. However, the Nesa film has the polarity n+, and hence it becomes an electron injection type to CdTe in the above layer structure, so that the above layer structure has a defect in that the dark current is increased. Furthermore, the high speed electron beam is employed for scanning the target, so that the above layer structure has the further defect that the scanning beam passing through the CdS layer and the CdTe layer successively flows into the signal electrode as a dark current.

Figure 8:
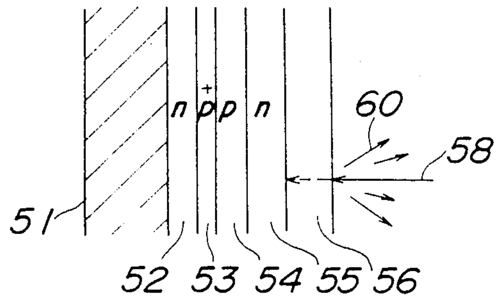
FIG. 8 is a partial cross-sectional view showing an example of the structure of the target of the same.

According to the present invention, the above-mentioned defects are removed, and hence the target structure fitting for the HN system can be realized as shown in FIG. 8.

In FIG. 8, 51 is a glass faceplate, and a Nesa film 52 is formed on the faceplate 51, for instance, by the chemical vapor deposition method, namely, the so-called CVD method. This Nesa film 52 is deoxidized for about ten minutes, similarly as disclosed previously by the inventor, by heating it at about 250° C. in a hydrogen atmosphere having a partial hydrogen pressure of $1\times10^{-4}$ Torr, as disclosed in Japanese Patent Application No. 135,866/1979 filed by the inventors of the present invention. As a result, the polarity of the Nesa film 52 is converted from strong $n^+$ to weak n. On a surface of this n-type Nesa film 52, a $p^+$ layer 53 is deposited as follows.

First, ZnTe is deposited on the nesa film 52 with a thickness of between 50 and 500 Å in an oxygen atmosphere. In this deposition, according to the method as disclosed in U.S. Pat. No. 4,352,834 the partial oxygen pressure is set at $1\times10^{-4}$ Torr, and the oxygen is activated by the electron beam or the like. ZnTe is first deposited with a thickness between 10 and 500 Å at a deposition velocity of between 1 and 10 Å/sec, and then further deposited with a thickness between 10 and 500 Å at an increased deposition velocity between 50 and 100 Å/sec. As a result thereof, the nesa film 52 is operated simply as a signal electrode, whilst the ZnTe film disposed close to the nesa film 52 is operated as the P+ layer 53, whereby the injection of the electrons is blocked. The ZnTe film has p-type polarity which becomes weaker as the film becomes remote from the Nesa film 52. This weak p-type film contained in the $p^+$ type layer 53 is provided for weakening the strong electric field caused between the CdTe layer and the $p^+$-type layer by depositing CdTe on the surface of the P+-type layer, which field makes remarkable spikes or humps. As a material of this $p^+$-type film 53, CdTe can be used, instead of ZnTe. However, CdTe presents larger light absorption than ZnTe, so that pure ZnTe is the most suitable. On the ZnTe film 53 formed as mentioned above, the p-type layer 54 consisting of CdTe and the n-type layer 55 consisting of CdS are deposited successively, so as to form a photoconductive layer.

In the case of the HN system, the energy of the electron beam landing on the target becomes 100 to 1000 eV, so that it becomes necessary to absorb this large amount of energy. For this requirement, a block or blocking layer 56 is deposited on the n-type layer 55 according to the present invention. It is preferable to form the block layer 56 of CdTe, ZnTe or a solid solution of these materials. The crystal structure of these materials is of Wurtzite-type or zinc blende-type, so that these materials can bear the beam impact, and further, since the molecular weights of these materials are large, a 20 to 2000 Å thick layer thereof can absorb the high speed electron beam sufficiently. In addition, these materials have an advantage in that the resistance thereof can be arbitrarily adjusted in accordance with vacuity or residual gas for forming a deposition film.

Figure 9:
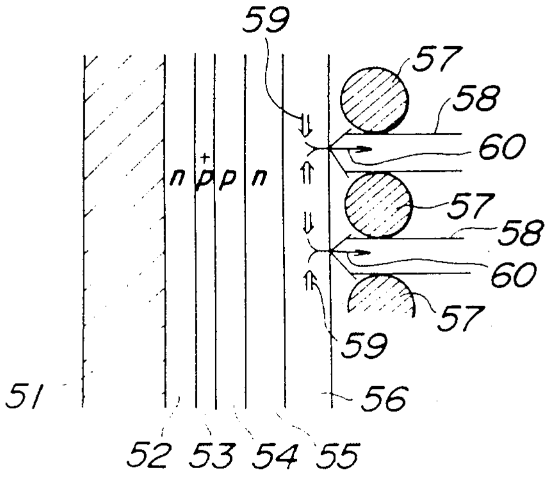
FIG. 9 is an enlarged partial sectional view showing operation of the same.

In a camera tube of the HN type, as shown in FIG. 9, portions of the target which are shadowed by the mesh 57 are not impacted by the high speed beam 58, and hence secondary electrons are not emitted therefrom. Accordingly, it is necessary to derive the output signal by leaking signals accumulated in those shadowed portions along the surface of the block layer 56, namely, in the lateral direction as shown by arrow marks and be emitting secondary electrons from the portions impacted by the electron beam 58. So that it is necessary also to form the block layer 56 of such a material as to block the high speed electron beam 58, as well as to make the resistivity in the lateral direction appropriately low and arbitrarily adjustable.

From the above necessities, the block layer 56 is formed by depositing ZnTe, CdTe or a solid solution thereof on the photoconductive layer in a hydrogen atmosphere having a hydrogen pressure of $1\times10^{-4}$ Torr.

The resistivity of the block layer 56 formed as mentioned above is between $10^8$ and $10^{13}$ Ωcm. When this deposition is effected, according to U.S. Pat. No. 4,352,834, in a hydrogen atmosphere formed by activating the hydrogen gas under the ionization effected by the electron beam, the reproducibility of the resistivity of the block layer 56 is further improved. In this situation, the desired resistivity can be obtained by setting the hydrogen pressure on the deposition at $1\times10^{-4}$ Torr and by varying the evaporation speed in a range of 1 to 100 Å/sec. For example, when the evaporation speed is less than 1 Å/sec, the resistivity becomes more than $10^{13}$ Ωcm, and, as a result, although the effect of blocking the electron beam can be obtained, the signal charge at the shadowed portion of the block layer 56 is not discharged and hence an afterimage is caused. On the other hand, when the evaporation speed is more than 100 Å/sec, the resistivity becomes too low, and, as a result, although the afterimage based on the shadowed portions of the block layer 56 can be removed, the leakage current becomes too large and hence the resolution is lowered. These results have been confirmed by an experiment. In this experiment, an evaporation speed range of 10 to 50 Å/sec was found particularly suitable for obtaining a block layer such that the afterimage is not caused and the resolution is not lowered.

The materials used for the target of the above mentioned type, that is, CdS, CdTe, ZnTe or the solid solutions thereof, have properties such that the evaporation thereof in a vacuum is effected by sublimation from the solid state without the step of liquidation. When these sublimative materials are heated in an ordinary conical alumina basket, the material at the portion contacting the basket sublimates first, so that the material at the upper portion thereof is apt to be scattered by the gas pressure of the evaporated material. To prevent this scattering, an evaporating source of the upper radiation type in which the heater is arranged above the material to be evaporated a variation thereof, that is, an evaporating source of the Drumheller type, namely, the commonly called chimney type has been developed. However, the scattering of the evaporation material can not be completely prevented even by these improved evaporating sources, and particularly when the heater temperature is raised to increase the evaporation speed, this tendency is remarkable. When powder materials such as CdS or the like, by which the infrared radiation can be hardly absorbed because of the wide forbidden band thereof, are employed, the inner portion of these materials is heated, more strongly than the surface portion thereof, and hence these materials are apt to be scattered. When the evaporation material is deposited on the target by the scattering thereof, the scattered and deposited material causes spikes on the reproduced picture, as well as often inducing a short circuit based on the electric field concentration on the scattered and deposited material in the situation where the target and the metal mesh are disposed adjacent to each other according to the present invention. Moreover, the infrared radiation emitted from the heater heats the source support, which is usually formed of metal, through the evaporation material, so that the power of the heater cannot help being increased. As a result, the heater supporting members are unnecessarily heated and hence often release the gas therefrom, the purity of the atmosphere of the deposition, which is formed of oxygen, hydrogen or the like, is deteriorated, and hence the reproducibility of the deposition is deteriorated also. In addition thereto, the conventional evaporating source has a further defect that the exchange of the evaporation material is somewhat complicated.

Figure 10A:
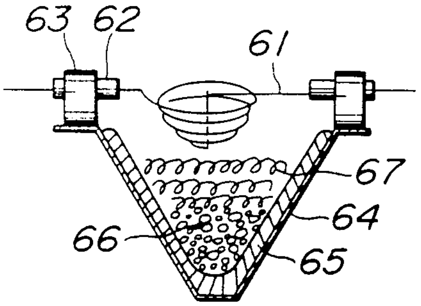
FIGS. 10A and 10B are a cross-sectional view and an enlarged partial diagram showing respectively an example of the arrangement of a deposition source used for manufacturing the target of the same.
Figure 10B:

It is effective for removing the above-mentioned various defects of the conventional evaporating source to employ an evaporating source having such a structure as shown in FIGS. 10A and 10B. In these drawings, 61 is a conical-shaped spiral heater formed of tungsten wire or the like, both ends of which are covered by porcelain members 62. 63 is a hook formed of Nichrome, Kovar or tantalum, so that it can be suspended by the porcelain member 62. A conical-shaped supporting vessel is hung on the hook 63, which vessel 64 is formed by pressing a nickel, Nichrome, Kovar, or tantalum sheet. The inner wall of the vessel is covered with an electrically deposited thermal insulation film 65 composed of a thermal insulation material such as alumina, magnesia and zirconia. A sublimative deposition material consisting of CdS, CdTe, ZnTe or a solid solution thereof is held in this supporting vessel 64, and further it is filled with a heat resistive filter 67 formed of a material such as quartz cotton or tungsten mesh which can bear the high temperature. A heater 61 is arranged over the filter 67 in such a way that the top of the spirally constructed heater is directed downward.

When the deposition is carried out, the filter 67 is heated by the heater 61, and then the heated filter 67 heats the upper surface of the deposition material. This evaporating source is operated such that the heat is radiated downwards, so that the heat is scarcely scattered, and powders of the evaporation material are not scattered at all. In addition thereto, since the supporting vessel 64 is covered by the heat insulation material 65, the heat loss is low, and hence the heater power required is less than one half of that required for the above-mentioned conventional source. Accordingly, unnecessary heating of the heater supporting members and release of gases from the vessel 64 are avoided.

Figure 11:
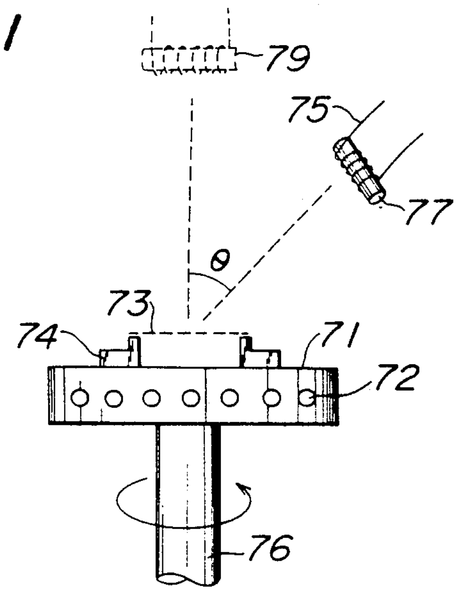
FIG. 11 is a diagram showing a method for insulating the mesh of the same.

Next, the method of depositing the insulation material 25 on the metal mesh 24 as shown in FIG. 7 will be described by referring to FIG. 11. In FIG. 11, 71 is a rotating table, in which a heater 72 is buried. A metal mesh 73 is put on a supporting bed 74 of the rotating table 71. 75 is a supporting member for the evaporating source, for instance, a coil formed of tungsten, which is arranged such that it is tilted by an angle $\theta$ against the rotation axle 76 of the rotating table 71, and in which an evaporating source 77 is accomodated in a block of an insulation material such as $MgF_2$, SiO, $Y_2O_5$ or a mixture thereof. Prior to the deposition, the metal mesh 73 is preheated by the heater 72 at 80° to 400° C. to securely fix the insulation material to the metal mesh 73. By the way, at a temperature below 80° C., it becomes impossible to effect a secure fixation by heating, whilst, at a temperature exceeding 400° C., there is an unfavorable effect in that the metal mesh 73 becomes ragged. Although only one coil 75 is sufficient, it is preferable for effecting uniform deposition to provide more than two coils 75. It is also preferable to set the angle $\theta$ of the coil 75 at 20 to 70 degrees. When the deposition is effected at the angle $\theta > 70°$ or $\theta < 20°$, the insulation material is deposited only on an upper surface of the metal mesh 73, whilst a small amount of the insulation material can be deposited on the side wall and the bottom thereof.

Figure 12A:
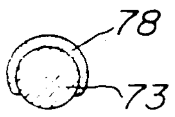
FIGS. 12A and 12B are diagrams showing two examples of insulation deposition of the mesh of the same respectively.
Figure 12B:
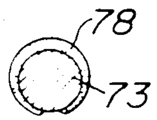

As mentioned above, the insulation material evaporated from the source 77 is deposited on the metal mesh 73 by heating the metal mesh 73 by the heater 72 and by rotating the axle 76 by a motor or by hand. It is preferable that the rotation speed of the axle 76 is set at a rate of one revolution per one second or per ten seconds, the speed of deposition is set at a rate of 1 to 1000 Å/sec, and a deposition film having a thickness 1000 Å to 5 μm is obtained. When the thickness of the film is less than 1000 Å, insufficient insulation is produced, and when the thickness of the film exceeds 5 μm, defects such as a clogged mesh often result. The uneven surface of the metal mesh 73 is thoroughly covered by the insulation material because of the rotation of the axle 76. It is insufficient for this deposition that only the upper and side surfaces of the mesh 73 be covered by the insulation material 78 as shown in FIG. 12A. Rather, it is required that the entire surface including the bottom surface of the mesh 73 be covered by the insulation material 78 as shown in FIG. 12B. If the deposition of the insulation material 78 is not effected as mentioned above, when a camera tube provided with an insufficiently covered metal mesh 73 is operated, the secondary electrons emitted from the target are caught by an uncovered portion such as the side surface of the metal mesh 73, and, as a result, the secondary electrons $I_{72}$ which can be collected by the collector electrode 28 as shown in FIG. 6 are reduced. The insulation material used for the above deposition can be selected from the group of $MgF_2$, SiO and $Y_2O_3$, and $MgF_2$ can be the most firmly deposited on a mesh 73 formed of copper. Accordingly, the insulation material is prevented from being mechanically peeled during assembly of the camera tube, which will be described later. In addition, the insulation material can sufficiently withstand an impact caused by the assembly procedure.

The almost entire surface including the rear surface of the metal mesh 73 is covered by the deposited insulation material, so that, for securing the electric conductivity of the rear side of the mesh 73, it is required that a conductive material is deposited only on the rear top portion of the mesh 73. In other words, when the rear surface of the mesh 73 is locally covered by the insulation material, the covered rear surface is charged by the scanning beam, and hence has a potential which is different from that in the remaining surfaces on which the copper is exposed. As a result, the irregular local variation of the mesh potential causes an uneven collection of the secondary electrons to contaminate the basic surface of the mesh 73. Accordingly, after the above deposition of the insulation material, the mesh 73 is turned over to put the rear surface upwardly. In this situation, a small amount of gold is deposited on the mesh 73 by another evaporating source 79 which is arranged just above the mesh as shown by dotted lines in FIG. 11, preferably at $\theta=0°$, so that gold is deposited only on the top portion of the mesh 73 on the beam scanning side and hardly deposited on the side surfaces thereof. In this case of gold deposition, the mesh 73 is rotated by the rotating axle 76, and, as a result, the microscopic unevenness of the surface of the mesh 73 can be smoothed by this gold deposition. However, it is preferable for the gold deposition that the heating by the heater 72 is not employed, because, when the mesh 73 is heated by the heater 72, the mesh 73 sags and hence the surface thereof facing the target is also covered by the deposited gold and, as a result, an inferior insulation is caused. In addition, it is also preferable that the gold evaporating source 79 be separated from the mesh 73 by more than 30 cm, so that the difference between the distances from the evaporating source 79 to the peripheral portion and to the central portion of the mesh 73 is minimized, and, as a result, the gold vapor is incident perpendicularly to the entire mesh 73. It is suitable that the deposited gold layer has a thickness between 30 Å and 300 Å. When the thickness thereof is less than 30 Å, inferior electric conduction is often caused, while, when the thickness thereof is more than 300 Å, particles of gold are often deposited around the side surfaces of the mesh 73.

In the above situation, it is feared that a small amount of lumped particles of gold is deposited on the surface of the mesh 73 on the side of the target, and hence the mesh 73 and the target are short-circuited. Therefore, it is preferable for preventing this short circuit that the mesh 73 is turned over again and an insulation material such as $MgF_2$, SiO, $Y_2O_3$ or the like is deposited again on the surface thereof facing the target. In this case, the evaporating source 77 is arranged at $\theta=0°$, so that the insulation material is deposited only on the top portions of the mesh 73 which face the target. It is suitable that the thickness of the deposited insulation layer is set about 150 to 2000 Å. When this thickness is less than 150 Å, the insulation of the mesh surface is inferior, while, when this thickness is more than 2000 Å, the insulation material covers around the surfaces of the gold film previously deposited on the mesh 73, and hence insulation failure is often caused.

As mentioned above, the deterioration of the basic surface of the metal mesh can be prevented by depositing gold as a conductive material of the surface thereof exposed to the scanning beam, and, as a result, the irregular variation of the potential of the metal mesh in response to the variation of the portions thereof is removed, so that the surface potential on the beam scanning side of the mesh can be made uniform.

The same effect as mentioned above can be obtained also by depositing the blocking material used for the target itself of the HN type against the high speed scanning electron beam, that is, CdTe, ZnTe or a solid solution thereof as mentioned earlier on the surface of the metal mesh on the beam scanning side thereof. In this case, which is different from the case of gold as a conductive material, the obtained electric reistivity is high because of the semiconductor material. However, this electric resistivity can be lowered by setting the hydrogen pressure at $1\times10^{-4}$ Torr and varying the evaporation speed in the range 1 to 100 Å/sec as mentioned earlier. Further, in the case of gold, when the thickness thereof is more than 300 Å, a short circuit between the mesh and the target is often caused by gold particles covering the backside of the mesh, whilst, in the case that CdTe, ZnTe or a solid solution thereof is employed, the above turning round is scarcely caused, so that, even when the thickness of the deposited film thereof becomes about 20 to 2000 Å, a short circuit between the mesh and the target does not occur at all. Accordingly, in the case that CdTe, ZnTe or the solid solution is deposited on the mesh, the thickness thereof is not restricted so severely as in the case of gold, so that there is an advantage in that it is not necessary to turn over the mesh again to deposit an insulation material such as $MgF_2$, SiO, $Y_2O_3$ or the like on the other side of the mesh as mentioned above. In this case, no inconvenience occurs even when an insulation material such as $MgF_2$, SiO, $Y_2O_3$ or the like is deposited thereon again as mentioned above for safety, as a matter of course.

The metal mesh formed as mentioned above is covered by the insulation material on the side of the target, so that the mesh and the target are not short-circuited with each other at all theoretically even when they are in direct contact with each other. However, if a portion of the mesh is not completely insulated, there is the possibility of a short circuit. Once the short circuit occurs, the mesh is broken. Accordingly, it is necessary to ensure that the mesh and the target are not short-circuited at all. This can be achieved by inserting an extremely thin ring of insulation material, about 0.5 to 5 μm thick, between the mesh and the target for holding a space therebetween.

In a conventional image orthicon, a spacer in the form of a metal ring having a thickness of about 5 to 30 μm is inserted between the mesh and the target thereof. However, such a metal ring cannot insulate the target from the mesh. Although it is conceivable to use a ceramic ring in place of the metal ring, it is impossible to reduce the thickness thereof to about 0.5 to 5 μm. On the other hand, although it is also conceivable to form the spacer by stamping out a mica sheet in the form of ring, the periphery of the mica ring has minute projections, namely, so-called naps, so that the thickness of the mica ring cannot be uniform. As mentioned above, a spacer which is suitable for a camera tube according to the present invention cannot be obtained when conventional material and a conventional method is employed. Consequently, the required spacer is formed by deposition. Two examples thereof will be described by referring to FIGS. 13A and 13B and 14A and 14B.

Figure 13A:
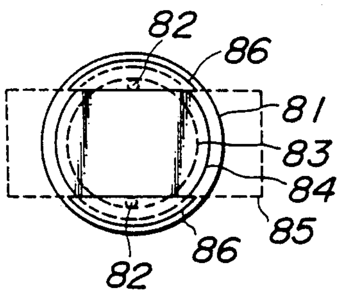
FIGS. 13A and 14A are plan views showing two examples of an insulation spacer inserted between the target and the mesh of the same respectively.
Figure 13B:
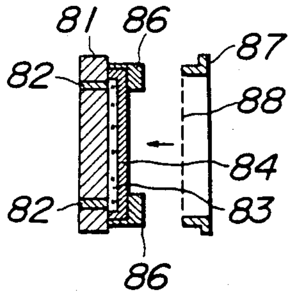
FIGS. 13B and 14B are cross-sectional views showing the same examples respectively.

In FIGS. 13A and 13B, 81 is a circular glass faceplate, in which a pin 82 formed of a metal wire made of a material such as Kovar has been previously buried in a flat-topped manner. This pin 82 is used for deriving the output signal from a signal electrode formed on the glass faceplate 81. A single pin 82 is enough. However, it is advantageous for checking the electrical resistance of the transparent electrode 83 to provide two pins 82. The transparent electrode 83 is deposited on the faceplate 81 provided with the pin 82, for instance, by the CVD method. For this deposition, it is preferable that a reinforcing electrode is provided on the surface of the pin 82, so as to improve the contact with the transparent electrode 83, by utilizing the teachings of the above-described Japanese Patent Application No. 135,866/1979. A target 84 is deposited on the transparent electrode 83 such that the transparent electrode 83 is thoroughly covered. That is, for this deposition, the target is deposited over an area which is wider than that of the transparent electrode 83, and, as a result, the portions of the transparent electrode 83 and the pin 82 are not exposed on the peripheral portion of the faceplate 81.

Figure 15:
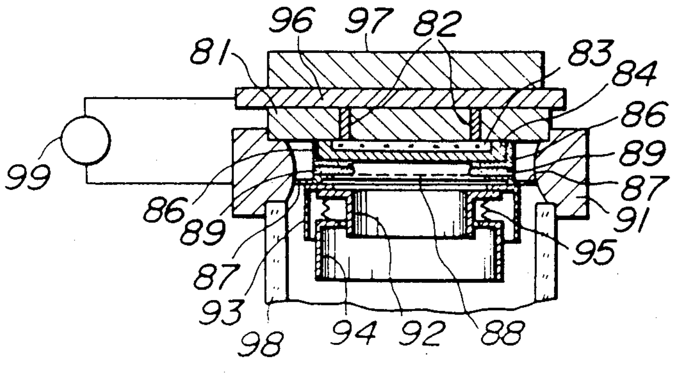
FIG. 15 is a cross-sectional view showing a method of manufacturing the TV camera tube according to the present invention.

This measure is effected for preventing a mesh 88 as mentioned later from being short-circuited to the exposed transparent electrode 83 and the exposed pin 82 and that a part of the secondary electrons, which have impacted the mesh 88 or an indium ring as mentioned later by referring to FIG. 15, flow directly into those exposed portions. A mask 85 as shown in FIG. 13A is used for depositing two, three or more crescent insulation spacers 86 on the surface of the target 84, and, as shown by an arrow mark in FIG. 13B, a mesh 88 stretched on a fixing ring 87 is fixed thereon. The material of the insulation spacer 86 can be selected from the group consisting of SiO, $MgF_2$, $Y_2O_3$ and the like. This material is deposited on the target 84 with a thickness of about 0.5 to 5 μm by evaporation in vacuum at less than $1\times10^{-3}$ Torr, and, as a result, the insulating spacer 86 for forming a space 0.5 to 5 μm between the target 84 and the mesh 88 can be obtained. When the space is less than 0.5 μm, the target 84 and the mesh 88 come into contact with each other through minute projections thereof or by the electrostatically absorbing force therebetween, so that the spacer 86 does not work as a spacer. If the space is more than 5 μm, the resolution is apt to be lowered by the spurious signal by redistribution. It is preferable that the insulation spacer 86, as shown in FIG. 13A, is formed of two crescents which are arranged opposite to each other in a direction which is perpendicular to a line connecting the two pins 82. This is because it is favorable that, since the raster has a rectangular shape having longer sides in the transverse direction, the beam scanning area, namely, the effective area is set as large as possible. The space between the target 84 and the mesh 88 can be held uniformly in a range from 0.5 μm to 5 μm by forming the insulation spacer 86 through the evaporation thereof. Moreover, in this case, such advantages can be obtained that mechanical damage such as when the insulation ring is inserted therebetween from the outside is not caused at all and that the insulation spacers having various dielectricities can be formed by changing the insulation materials to be evaporated.

Figure 14A:
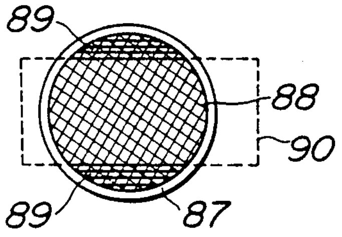
Figure 14B:
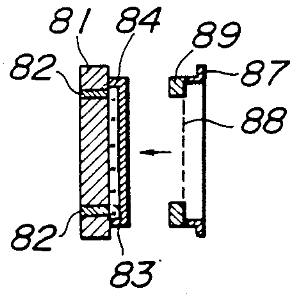

Although the insulation spacer is deposited on the target in the examples shown in FIGS. 13A and 13B, the mesh, on which the insulation spacer has been previously deposited, may be fixed to the target. This example is shown in FIGS. 14A and 14B in which the same parts are indicated by the same marks respectively as in FIGS. 13A and 13B. In FIGS. 14A and 14B, 89 is an insulation spacer deposited on the mesh 88. Two crescent spacers 89 are deposited, as shown in FIG. 14A, on the surface of the mesh 88 which is stretched on a fixing ring 87 on the side thereof facing the target. The evaporation material and the thickness thereof are just the same as shown in FIGS. 13A and 13B, and the situation where chords of two crescent spacers 89 which are opposite to each other are arranged perpendicular to the vertical direction of the raster is also just the same as that shown in FIGS. 13A and 13B. Further, the mesh 88 is arranged in such a way that individual sections thereof can be scanned by the electron beam along the diagonal direction, and hence the mesh beat caused by the scanning beam does not appear. By the way, it is naturally possible that the insulation spacer 86 as shown in FIGS. 13A and 13B is deposited on the target 84 and the insulation spacer 89 as shown in FIGS. 14A and 14B is deposited on the mesh 88, and further both spacers 86 and 89 are secured to each other.

Next, the method for assembling the target and the mesh with the electron gun in the camera tube according to the present invention will be described by referring to FIG. 15. That is, the case that the target and the mesh are assembled with an electron gun available on the market, for instance, of the separated mesh type used for the LP system will be described. In FIG. 15, the same parts as those in FIGS. 13A and 13B or in FIGS. 14A and 14B are indicated by the same marks. Further, in FIG. 15, the indium ring 91 is used for vacuum-sealing the envelope of the camera tube and is operated as an electrode for applying the voltage to the mesh 88 by being contacted to the fixing ring 87 fixed on the peripheral portion of the mesh 88. 92 is a mesh rack for disposing the mesh 88 thereon through a Teflon ring 93. The mesh 88 is fixed on the $G_4$ electrode 94 in a conventional camera tube of the LP type, while the teflon ring 93 having a thickness of 0.1 to 0.8 mm is used for insulating the mesh 88 from the $G_4$ electrode 94. The Teflon ring 93 has a skirt portion on the periphery thereof for preventing the indium ring 91 from electric contact with the mesh rack 92 and a spring 95. That is, the mesh rack 92 is arranged such that it always has an upwards deflecting force exerted by the spring 95 provided between the $G_4$ electrode 94 and the mesh rack 92 itself, whereby the mesh 88 is always pushed against the faceplate 81. Even if the distance between the $G_4$ electrode 94 and the faceplate 81 is varied, for instance, by the heat expansion caused during operation of the camera tube, the mesh 88 can be prevented from separating from the target 84, so that the distance between the mesh 88 and the target 84 can be held at a constant amount. Furthermore, 96 denotes a conductive gum sheet for deriving the signal from the pin 82 of the faceplate 81, 97 a metal holder for holding the faceplate which is mounted on the outer side of the gum sheet 96 in a manner electrically insulating it from ground, and 98 a glass envelope surrounding the $G_4$ electrode 94. 99 is a capacitance meter used while assembling the camera tube according to the present invention. The meter 99 is connected between the conductive gum sheet 96 and the indium ring 91 to measure the capacitance therebetween.

For assembling the camera tube according to the present invention, first the mesh rack 92 is disposed on the $G_4$ electrode 94 through the spring 95, and then is covered by the Teflon ring 93, on which the mesh 88 is diposed, as well as the indium ring 91 is disposed on an opening end of the glass envelope 98. In this state, the indium ring 91 is not yet crushed and hence is not yet contacted with the mesh 88. Next, the indium ring 91 is crushed downwards by the faceplate 81 absorbed, for instance, through the vacuum chuck, whereby the faceplate 81 and the glass envelope 98 are vacuum-sealed therebetween, as well as a mesh fixing ring 87 is contacted with the crushed indium ring by pushing it thereinto. In this procedure, the conductive gum sheet 96 disposed upon the faceplate 81 is crushed by being contacted with the pin 82, and further the capacitance meter 99 is connected between the gum sheet 96 and the indium ring 91 so that the capacitance between the transparent electrode 83 and the indium ring 91 through the mesh 88 can be measured.

In the above procedure for crushing the indium ring 91, in a state such that the indium ring 91 and the mesh 88 are not yet contacted with each other, the capacitance meter 99 indicates a capacitance of about 20 pF for a one inch type target. Next, at the instant that the indium ring 91 and the mesh 88 are in contact with each other, the capacitance therebetween increases abruptly, and hence the capacitance meter 99 indicates about 2000 pF. At this instant, the procedure of pushing the indium ring 91 is finished. As mentioned above, the vacuum sealing caused by the indium ring 91 is effected by setting up a standard for the variation of capacitance between the indium ring 91 and the mesh 88, so that the contact between the indium ring 91 and the mesh 88 can be confirmed, as well as the mesh 88 can be prevented from the deformation thereof caused by the excessively large pressure applied to the peripheral portion of the mesh 88 by the crushed indium ring 91.

In the above vacuum sealing procedure, when the faceplate 81 is directly pressed by the faceplate holder 97 absorbed, for instance, by the vacuum chuck, a large amount of distortion is caused on the portions of the pin 82, so that it is feared that the faceplate 81 is broken. Accordingly, in this situation, the above-mentioned conductive gum sheet 96 is inserted between the faceplate 81 and the faceplate holder 97, and hence the pressure caused by the faceplate 97 is uniformly applied to the faceplate 81, whereby the faceplate 81 can be prevented from being damaged.

After the vacuum sealing has been completed, the capacitance between the pin 82 and the indium ring 91 becomes about 2000 pF in the case of a one inch type target, as well as the capacitance between the indium ring 91 and the $G_4$ electrode 94 becomes a few pF. The latter capacitance can be reduced as small as possible by increasing the thickness of the teflon ring 93. However, it is usually preferable to select the thickness of the Teflon ring 93 at about 0.1 to 0.8 mm.

Next, the camera circuit according to the present invention for deriving the output signal from the above-mentioned camera tube of the HN type of the present invention will be described in detail.

The structure of the above-mentioned camera tube according to the present invention and the basic arrangement of the circuitry for deriving the output signal and driving the camera tube have been shown in FIG. 6. In FIG. 6, 20 denotes the entire camera tube structure, 21 is a cathode, 22 is a signal deriving electrode consisting of a transparent electrode formed, for instance of Nesa film, 23 is a target formed on the transparent electrode 22, and 24 is a metal mesh arranged close or adjacent to the target 23 so as to prevent generation of the spurious signal by redistribution.

As shown in FIG. 7, the metal mesh 24 is covered by an insulation material 25 deposited on a side thereof facing the target 23, so as to prevent an electrical connection between the metal mesh 24 and the target 23. The surface of the metal mesh 24 at the other side facing the cathode 21 is prevented from being covered by the insulation material 25, so as to maintain the mesh potential at a substantially constant level by injecting a part 27 of the electron beam 26 into the metal mesh 24 during beam scanning. A collector electrode 28 is arranged between the metal mesh 24 and the cathode 21, so as to collect scanning electrons 29 emitted from the target 23 by the scanning beam 26. The major part of the secondary electrons 29 passes through the metal mesh 24 and then is collected by the collector electrode 28, whilst the minor part 30 thereof is collected by the metal mesh 24. On the other hand, secondary electrons 31 emitted from the metal mesh 24 by primary scanning beam 27 injected into the mesh 24 are collected also by the collector electrode 28. The collector electrode 28 can be used in common for the beam collecting electrode, the beam accellerating electrode and the like, which are usually called as $G_4$, $G_3$ and $G_2$ respectively, for instance, when an electron gun available on the market is utilized. In this configuration of the camera tube, the metal mesh 24 and the collector electrode 28 are insulated from each other in the camera tube 20, as well as the metal mesh 24 and the target 23 are insulated also inside the camera tube 20.

Next, the camera circuit according to the present invention for deriving the above-mentioned camera tube 20 will be described by referring to FIG. 6. In FIG. 6, a capacitor 32 having a large capacitance of, for instance, 1000 pF to 0.1 $\mu$F is connected between the metal mesh 24 and the target 23, namely, the signal electrode 22, whereby the mesh potential is maintained at a substantially constant level, and further the metal mesh 24 is connected to an end of a series circuit of a resistor 33 having a high resistance which is sufficiently larger than the input impedance of the preamplifier 38, for instance, larger than 1M$\Omega$ and a switch 34 which is opened only at a blanking period of the scanning beam and is closed when the scanning beam is scanning the mesh 24 and the target 23. Another end of the series circuit is connected to the connection point between the positive terminal of a target voltage source 35 of a voltage $V_T$ for charging the target 23 at negative potential and the negative terminal of a mesh voltage source 36 of a voltage $V_M$ for charging the collector electrode 28 at a more positive voltage than the metal mesh 24. The negative terminal of the target voltage source 35 is connected to ground, as well as connected to the signal electrode 22 through a dc current meter 37 inserted for measuring the dc signal current $I_S$ and the preamplifier 38 used for deriving the output signal. The above-mentioned high resistance resistor 33 is used for preventing the deterioration of the SN ratio of the output signal which is caused by the parallel connection of the preamplifier 38 and the large capacitor 32. In order to prevent breakdown of the insulation between the mesh 24 and the target 23 which is caused by the surge voltage, the cathode 21 is not grounded, but the voltage source 35 thereof is grounded. It is preferable to set the voltage of the target voltage source 35 in a range between 0 volt and several tens of volts, whilst it is also preferable to set the voltage of the mesh voltage source 36 in a range between 10 volts and 50 volts. The positive terminal of the mesh voltage source 36 is connected to the collector electrode 28. A dc high voltage source 39 in a range between 300 volts and 1000 volts is connected between the collector electrode 28 and the cathode 21. The voltage of this voltage source 39 is set as high as possible so that the value $\delta$ of the target 23 becomes more than unity, as well as it is preferable to set the above voltage, for instance, at a value near 800 volts for improving the resolution performance.

Next, the operation of the camera circuit according to the present invention as shown in FIG. 6 will be described.

As shown in FIG. 6, among the primary scanning beams 26 and 27, a part 30 of the secondary electrons generated by the beam 26 injected into the target 23, that is, the current $I_{T1}$, flows into the metal mesh 24 as a current $I_{T2}'$, whilst the metal mesh 24 is covered by the insulation material 25 except the side thereof scanned by the scanning beam as shown in FIG. 7, so that the major part of the secondary electrons emitted from the target 23 arrives at the collector electrode 28 having applied thereto a voltage which is more positive than that of the metal mesh 24 through the metal mesh 24, and is derived therefrom as the curret $I_{T2}$. As mentioned above, the following electron current $I_s$ flows through the preamplifier 38 and the dc current meter 37;

$$I_S = I_{T1} - I_{T2} + \alpha,$$

where $\alpha$ is a component consisting of the dc current leaking to the signal electrode 22 through the resistor 33, which dc current is the remaining part of the secondary electrons $I_{T2}'$ collected by the mesh 24 and discharged by the capacitor 32. As mentioned above, the current $I_{T2}'$ can be set less than 3% of the entire flow of secondary electrons by applying the insulation processing to the mesh 24, so that $\alpha$ can be set still further below the amount $I_{T2}'$, and hence the loss of the output signal of the RB mode as mentioned above is hardly caused. In other words, the major part of the secondary electrons $I_{T2}$ can be collected by the collector electrode 28 without any loss. Since the electron current $I_s$ is generated by discharging the electric charge of the accumulated light signals, it is no more than the signal current. In other words, almost all of the electron current flows through the preamplifier 38 and the dc current meter 37. Furthermore, the distance between the metal mesh 24 and the collector electrode 28 can be increased as long as possible, and the stray capacitance therebetween can be reduced, for instance, less than 1 pF. Accordingly, in the camera circuit according to the present invention, the deterioration of SN ratio based on the stray capacitance is not caused at all. On the other hand, the distance between the mesh 24 and the signal electrode 22 is extremely short, and hence the capacitance therebetween becomes 2000 pF in the case of a one inch type camera tube, and further a capacitor 32 having a large capacitance is coupled with the external circuit. However, these capacitors are connected with the preamplifier 38 in series through the resistor 33, and hence are not directly connected therewith in parallel, so that the deterioration of the SN ratio is hardly caused.

In addition, the signal deriving circuit as shown in FIG. 6 is operated substantially in the T mode in which the preamplifier is inserted on the side of the target, so that, as is different from the M mode or the RB mode, the preamplifier 38 and the dc current meter 37 are not supplied with a current consisting of the difference between the current $I_{M1}$ which flows into the mesh 24 due to the scanning beam 27 to the mesh 24 and the current $I_{M2}$ consisting of the secondary electrons 31 emitted from the metal mesh 24 by the scanning beam 27. Accordingly, the preamplifier 38 is supplied only with the signal current, and hence the deterioration of the SN ratio does not occur at all. Moreover, in the camera tube constructed as shown in FIG. 6, the space between the mesh 24 and the target 23 can be reduced to as narrow an amount as possible so that it is possible to thoroughly remove the spurious signal by the redistribution accompanied with the high speed scanning.

Here, the selection of the capacitance C of the capacitor 32 and the resistance R of the resistor 33 will be described. It is preferable to select the time constant CR thereof so as to maintain the constant mesh potential and the input impedance of the preamplifier. It is generally suitable to set the time constant CR larger than 1/30 second. When the time constant CR is smaller than 1/30 second, a microphonic noise is easily caused. The reason thereof is that the mesh potential is varied in response to the variation of the current $I_{T2}'$ flowing into the mesh 24, and, as a result, the coulomb absorbing force between the mesh 24 and the signal electrode 22 is locally varied. For practically selecting the time constant CR, first, the resistance R should be set sufficiently larger than the input impedance of the preamplifier 38. For example, when the input impedance of the preamplifier 38 is 4MΩ, it is suitable to set the resistance R at 20MΩ. In this case, it is desirable to set the capacitance C at more than 1200 pF under the condition of CR>1/30 second. By the way, the microphonic noise appears usually in a form of lateral stripes in the reproduced picture. The practical cause thereof is not yet clear. However, it is at least clear that all of the microphonic noise can be prevented by selecting the time constant CR to be larger than 1/30 second.

In FIG. 6, in the situation where the scanning beam is operated, the voltage applied to the capacitor 32 is the sum of the voltage $V_T$ of the voltage source 35 and the voltage $\Delta V = (I_{M2} - I_{M1})$ R based on the mesh current $(I_{M2} - I_{M1})$ flowing through the resistor 33. That is, the capacitor 32 has applied thereacross the voltage $V_T$ which is fixed regardless of the on, off state of the scanning beam and the voltage $\Delta V$ which is generated only by supplying the beam current.

In the blanking period during which the scanning beam is in the off state, the preamplifier 38 is supplied with the discharge current caused by the voltage $\Delta V$. As a result of the experiment, this discharge current amounts to 1 μA. Next, when the scanning beam is in the on state, the capacitor is charged again by an amount determined by the electric charges discharged in the off state. As mentioned above, the preamplifier 38 is supplied with the discharge current in response to the on-off state of the scanning beam. According thereto, the clamp level is varied, and hence the black level of the output picture signal is remarkably varied. These charge and discharge currents do not cause only the variation of the clamp level but also the deterioration of the SN ratio, so that it is required to remove these charge and discharge currents.

Figure 16:
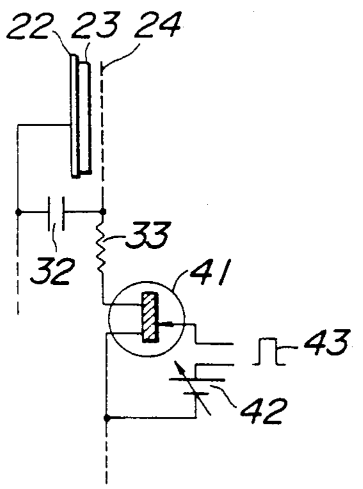
FIGS. 16 to 20 are circuit diagrams showing various examples of switching circuit of the same respectively.
Figure 17:
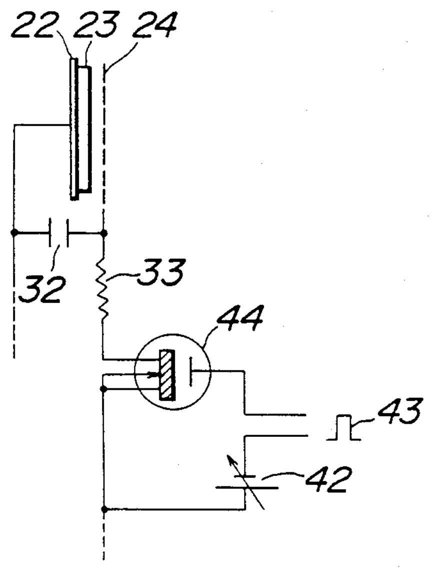
Figure 18:
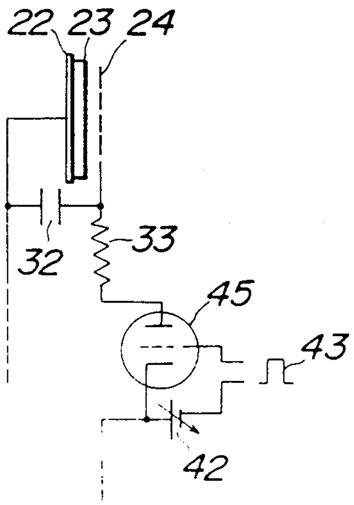
Figure 19:
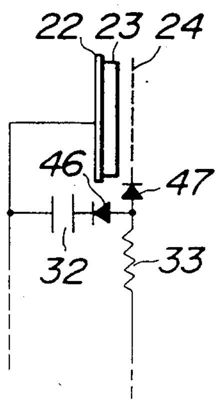
Figure 20:
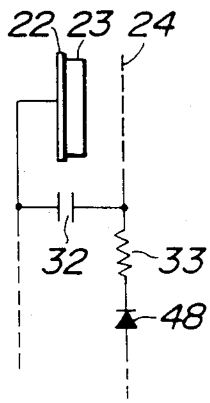

By referring to the above, the camera circuit as shown in FIG. 6 according to the present invention has a switch 34, which is closed during beam scanning, and is opened during the blanking period. This switch 34 can be formed, as shown in FIGS. 16 to 20, for instance, of a field effect transistor, a MOS type field effect transistor, a vacuum tube, a diode or the like. In FIG. 16, the switch 34 is formed of a field effect transistor 41, between a gate and a source of which a clamping pulse 43 generated in synchronism with the beam blanking is applied through a bias voltage source 42. A current path between the source and the drain of the transistor 41 is closed and opened under the control of the clamping pulse 43 corresponding to the on-off state of the scanning beam. An example shown in FIG. 17 is the same as in FIG. 16 except that the field effect transistor 41 is replaced with a MOS type field effect transistor 44. An example shown in FIG. 18 is the same as in FIG. 17 except that the MOS type field effect transistor 44 is replaced by a vacuum tube 45. In this example, the clamping pulse 43 is applied between a grid and a cathode of the vacuum tube 45 so as to control the on-off state therebetween. In FIG. 19, diodes 46 and 47 are connected between the capacitor 32 and the mesh 24, so as to block the discharge of the capacitor 32 in the off state of the scanning beam. In FIG. 20, this blocking of the discharge is effected by a diode 48 connected at the position of the switch 34 as shown in FIG. 6. The switch 34, which is formed in various configurations as mentioned above, is closed only during the beam scanning, and opened in the remaining duration, whereby it can be prevented that the preamplifier 38 is supplied with the discharge current generated by the variation of the potential of the capacitor 32, and hence the black level during the clamping can be maintained at a constant level.

Figure 21:
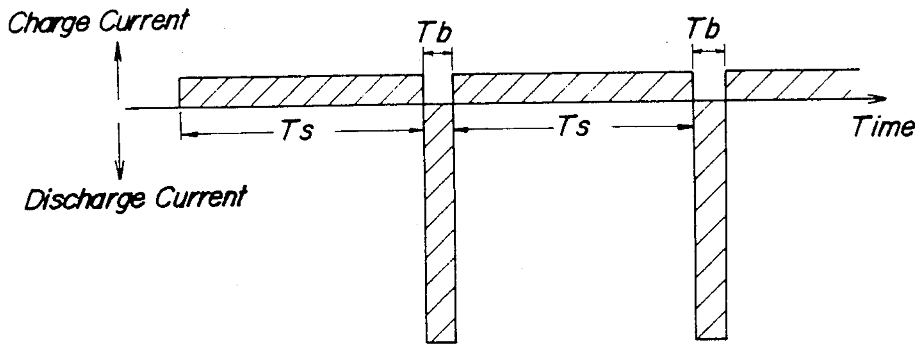
FIG. 21 is a diagram showing the charge and discharge operations of the same.

On the other hand, regarding the charge and discharge currents of the capacitor 32 as shown in FIG. 6, the charge current appears during the beam scanning period $T_s$, whilst the discharge current appears during the blanking period $T_b$, as shown in FIG. 21. In the situation where the switch 34, which effects the above-mentioned switching between the charge and the discharge, is formed of the field effect transistor, the MOS type field effect transistor or the diode as mentioned above, the following difficulties are caused.

Figure 22:
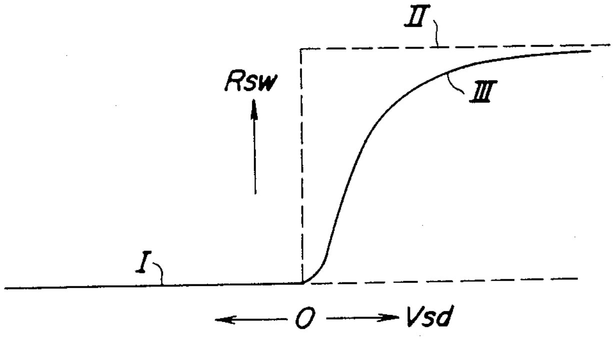
FIG. 22 is a diagram showing the performance of the switching circuit of the same.

For example, the relation between the source to drain voltage $V_{sd}$ of the field effect transistor and the switch resistance $R_{sw}$ deviates from the ideal steep on-off performance as shown by a broken line II in FIG. 22, and hence is deformed so as to have a somewhat gentle slope as shown by a solid line III in FIG. 22. In FIG. 22, a solid line I shows a resistance in the on-state thereof, which amounts ideally to zero ohm. When $V_{sd} \geqq 0$, a high (infinite) resistance as shown by the broken line II in FIG. 22 can be ideally obtained. However, the complete off state cannot be practically obtained, as shown by the solid line III in FIG. 22, so long as the voltage $V_{sd}$ is not extremely high. Consequently such a practically usable switch as mentioned above has a defect in that the off state thereof can be obtained only after a large amount of discharge current flows already.

Figure 23:
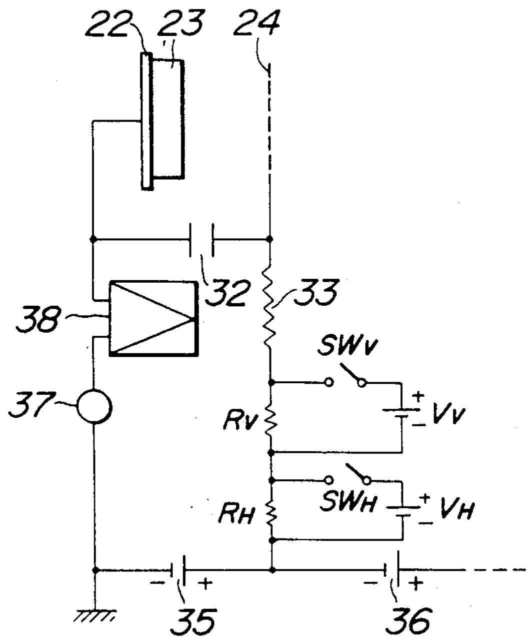
FIGS. 23 and 24 are circuit diagrams showing two examples of improved circuit arrangements operating equivalently to the switching circuit of the same respectively.
Figure 24:
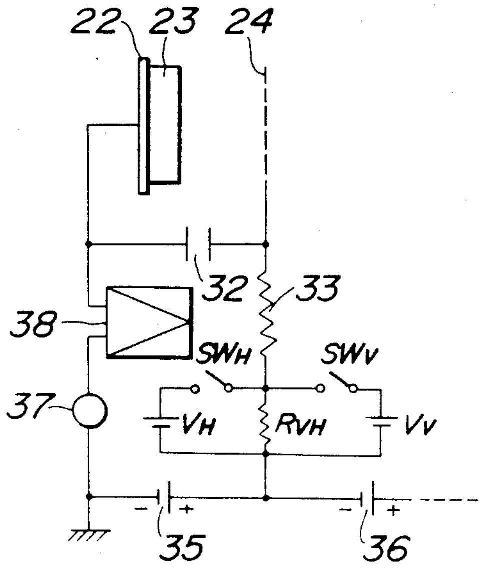

For removing the above defect, it is suitable that the discharge of the capacitor 32 is blocked by inserting a dc voltage source, for instance, a battery having the above-mentioned voltage $\Delta V = (I_{M2} - I_{M1})R$ in place of the switch 34 only during the blanking period. In this case, the voltage $\Delta V$ is different between the horizontal blanking period and the vertical blanking period, so that a battery having an appropriate voltage $\Delta V$ is inserted in place of the switch 34 in synchronism with both of those blanking periods. Two practical examples thereof are shown in FIGS. 23 and 24. FIG. 23 shows a circuit configuration in which two battery inserting circuits respectively corresponding to the horizontal and the vertical blanking periods are connected in series with each other. In this circuit configuration, a series circuit of a battery $V_v$ having a voltage $\Delta V$ corresponding to the vertical blanking period and a switch $SW_v$ closing during the vertical blanking period is connected between both ends of a resistor $R_V$, as well as another series circuit of another battery $V_H$ having another voltage $\Delta V$ corresponding to the horizontal blanking period and another switch $SW_H$ closing during the horizontal blanking period is connected between both ends of another resistor $R_H$, and further an end of a series connection of those resistors $R_v$ and $R_H$ is connected with the resistor 33, as well as another end thereof is connected with the positive side of the target voltage source 35. In this situation, the sum of the resistances of those resistors $R_v$ and $R_H$ is set to be sufficiently smaller than the resistance R of the resistor 33. As a result thereof, the switch $SW_v$ or $SW_H$ is closed during the vertical or the horizontal blanking period respectively, and hence the potential at the top of the series connection of those resistors 33, $R_v$ and $R_H$ is raised by the voltage of the battery $V_v$ or $V_H$, whereby the discharge of the capacitor 32 is blocked.

On the other hand, FIG. 24 shows another circuit arrangement in which two battery inserting circuits respectively corresponding to the horizontal and the vertical blanking periods are connected in parallel with each other. In this circuit arrangement, a resistor $R_{VH}$ having a resistance which is sufficiently smaller than the resistance R of the resistor 33 is connected between the resistor 33 and the positive side of the target voltage source 35, and further a series circuit of the switch $SW_H$ and the battery $V_H$ and another series circuit of the switch $SW_V$ and the battery $V_v$ are connected between both ends of the above resistor $R_{VH}$ in parallel. The circuit arrangement shown in FIG. 24 is operated similarly to that shown in FIG. 23, whereby the discharge of the capacitor 32 can be blocked.

As is apparent from the above, the following various advantageous effects can be obtained according to the present invention.

(1) The block layer having resistivity against the electron impact is provided on the beam scanning side of the photoconductive layer, whereby the high speed electron beam of the HN system is blocked to penetrate the photoconductive layer, so that a camera tube of the HN type can be effectively realized.

(2) The distance between the metal mesh and the target can be reduced to be as narrow as possible, so that the grounded stray capacitance of the target can be reduced also, and, as a result, generation of the spurious signal by redistribution can be completely prevented.

(3) The resistivity in the lateral direction of the block layer can be set at an appropriately low value by forming the block layer at the appropriate evaporation speed of the material thereof, so that the signal charge accumulated at the portion of the target which is shadowed by the mesh can be leaked in the block layer along the lateral direction thereof and hence can be derived therefrom by being emitted from the beam injecting portion thereof as the secondary electron, so that the conventional problem of the shadow can be resolved.

(4) The target of the HN type can be easily obtained only by forming the p+ type electron blocking layer on the usual n type transparent electrode layer under the evaporation of ZnTe in an oxygen atmosphere and further by depositing the p-n type photoconductive layer which has a reverse polarity to that of the LP type and then the n+ type block layer on the surface of the electron blocking layer.

(5) The insulation film is deposited on the surface facing the target and the side of the metal mesh, so that the signal current leaking toward the metal mesh can be reduced as small as possible and hence more than 90% of the signal current can be collected by the collector electrode. Accordingly, even if the electron passing rate of the mesh is only about 50%, the major part of the secondary electrons can be passing through the mesh owing to the above insulation layer thereon and hence can arrive at the collector electrode, so that the loss of the signal current can be minimized.

(6) A camera tube of the HN type can easily be manufactured in a manner substantially similar to that of the usual LP type only by assemblying the HN type target and the metal mesh in an electron gun available on the market for the usual LP system by employing the pinned faceplate, the Teflon ring, the conductive gum sheet and the like and then by effecting the vacuum sealing by the indium ring.

(7) For effecting the evaporation of the target, particles of CdS, CdTe, ZnTe or the solid solution thereof are evaporated from the upperside thereof through a filter in the form of heated quartz cotton, tungsten mesh or the like, so that the particles do not scatter. Accordingly, a uniform and faultless target can be obtained and hence a short circuit between the target and the metal mesh can be completely prevented.

(8) For deposition of the target, particles of CdS, CdTe, ZnTe or the solid solution thereof is accommodated in a heat-insulated supporting vessel, and hence the loss of heat is prevented to the utmost, so that the gas generated from the tools during the heating is greatly reduced and hence the deterioration caused by the gas is also reduced, and, as a result, the target can be formed with excellent reproducibility.

(9) The camera tube according to the present invention has all the advantages to be expected for a camera tube of the HN type; capacitive discharge lag performance is excellent, resolution performance is excellent, especially in the peripheral portion and beam bending does not occur at all. In addition, the camera tube according to the present invention has further advantages in that the SN ratio is preferable, the spurious signal by redistribution is removed and the dark current is reduced, so that all of the defects of the conventional camera tube of the HN type are removed. Moreover, the excellent camera tube as mentioned above can be manufactured by easily utilizing the manufacturing and assembling technique of a conventional camera tube of the LP type.

(10) The output signal can be obtained in the situation where the defects caused by applying the T mode, the M mode and the RB mode to a camera tube of the HN type in a usual manner are removed. Particularly, as is different from the usual RB mode, according to the present invention, the output signal is derived substantially in the T mode, so that the component generated by the unavailable beam flowing into the metal mesh is not mixed at all into the output signal to be applied to the preamplifier, and hence the signal current is not reduced at all as in the conventional camera tube. On the other hand, since the insulation film is deposited on the surface facing the target and the side surface of the metal mesh, the leakage of the signal current into the metal mesh is reduced to the utmost, whereby more than 97% of the signal current can be collected by the collector electrode. So that, even if the electron passing rate of the metal mesh is only about 50%, the major part of the secondary electrons passes through the metal mesh and arrives at the collector electrode by the above-mentioned insulation film, and hence the loss of the signal current can be reduced.

(11) The distance between the metal mesh and the target is reduced for preventing generation of the spurious signal by redistribution, and hence the capacitance therebetween is increased, and further the capacitor having the large capacitance provided for keeping the mesh potential at a constant level is connected between the mesh and the target. However, since the external resistor having the high resistance is connected between the mesh and the preamplifier, the above-mentioned capacitor is not coupled with the preamplifier in parallel, the time lag is not caused for the derivation of the output signal. Moreover, according to the presence of the above high resistance resistor, the large capacitor can be connected between the mesh and the target for preventing the variation of the mesh potential, so that microphonic noise is not caused at all.

(12) The switch is provided in parallel with the high resistor connected to the metal mesh, and this switch is closed only during the beam blanking period, the variation of the potential of the large capacitor connected in parallel with the metal mesh can be prevented and hence the discharge current of the large capacitor is prevented from flowing into the preamplifier during the beam blanking period. In addition, a usual blanking circuit can normally be operated directly by the switch.

What is claimed is:

1. A TV camera tube having an envelope containing a glass faceplate and an electron gun including a cathode, comprising:

an n-type transparent electrode layer formed on said glass faceplate;

a photoconductive target composed at least of a photoconductive layer formed by depositing a thin $p^+$-type layer, a p-type layer and an n-type layer in succession on said n-type transparent electrode layer, and a block layer formed on said photoconductive layer for blocking an electron beam emitted from said cathode passing through said photoconductive layer;

a metal mesh disposed in the vicinity of a side of said photoconductive target, said side being scanned by said electron beam; and a collector electrode disposed between said metal mesh and said cathode for collecting secondary electrons emitted from said photoconductive target, whereby said photoconductive target is scanned by said electron beam emitted from said cathode.

2. A TV camera tube as claimed in claim 1, wherein said block layer has a thickness between 20 Å and 2000 Å, and is formed of a compound selected from the group consisting of ZnTe, CdTe and a solid solution of ZnTe and CdTe.

3. A TV camera tube as claimed in claim 1, wherein the resistivity of said block layer is within the range $10^8$ Ωcm to $10^{12}$ Ωcm.

4. A TV camera tube as claimed in claim 1, wherein an insulating spacer providing a space between said block layer and said metal mesh is deposited on at least one of said block layer and said metal mesh.

5. A TV camera tube as claimed in claim 4, wherein said insulating spacer is formed of a material including at least one compound selected from the group consisting of SiO, $MgF_2$ and $Y_2O_3$.

6. A TV camera tube as claimed in claim 4, wherein the thickness of said insulating spacer is within the range 0.5 μm to 5 μm.

7. A TV camera tube as claimed in claim 1, wherein the side of said metal mesh which faces said block layer is covered with an insulation material, whereby secondary electrons emitted from said photoconductive target are collected by said collector electrode without being collected by said metal mesh.

8. A TV camera tube as claimed in claim 7, wherein said metal mesh covered by said insulation material is positioned adjacent the block layer of said photoconductive target.

9. A TV camera tube as claimed in claim 7, wherein said insulation material is formed of at least one compound selected from the group consisting of SiO, $MgF_2$ and $Y_2O_3$.

10. A TV camera tube as claimed in claim 7, wherein said insulation material is deposited on said metal mesh with a thickness in the range from 1000 Å to 5 μm.

11. A TV camera tube as claimed in claim 7, wherein a conductive film is deposited on the side of said metal mesh which faces said collector electrode, said conductive film maintaining a uniform potential on said metal mesh.

12. A TV camera tube as claimed in claim 11, wherein said conductive film consists of gold, which is deposited with a thickness in the range from 30 Å to 300 Å.

13. A TV camera tube as claimed in claim 1, wherein said n-type transparent electrode is formed of a Nesa film; said p+-type layer is formed of a compound selected from the group consisting of ZnTe and CdTe, the p-type polarity thereof being weakened towards said p-type layer thereby preventing a strong electric field from being applied between said p+-type layer and said p-type layer; and wherein said p-type layer is formed of CdTe and said n-type layer is formed of CdS.

14. A TV camera tube as claimed in claim 1, wherein said collector electrode is constituted of a $G_4$ electrode, on which a mesh rack is disposed, said mesh rack being covered by a skirted Teflon ring, on which said metal mesh is disposed, an indium ring being disposed on an opening end of a glass envelope of said camera tube, said glass faceplate belonging to a block consisting of said glass faceplate, said n-type transparent electrode and said photoconductive target being disposed on said indium ring, a faceplate holder being disposed on said glass faceplate through a conductive gum sheet, said glass envelope being vacuum-sealed by crushing said indium ring under a pressure caused by pushing said glass faceplate from said faceplate holder side towards said metal mesh, whereby the inside of the crushed indium ring is contacted with said metal mesh.

15. A TV camera tube as claimed in claim 14, wherein an electrically conductive pin is embedded within said glass faceplate, said pin electrically connecting said transparent electrode to said conductive gum sheet for measuring the capacitance between said transparent electrode and said indium ring.

16. A TV camera tube as claimed in claim 7, wherein a semiconductive film is deposited on the side of said metal mesh which faces said collector electrode, said conductive film maintaining a uniform potential on said metal mesh.

17. A camera tube circuit for operating a TV camera tube having an envelope containing a glass faceplate and an electron gun including a cathode; an n-type transparent electrode layer formed on said glass faceplate; a photoconductive target composed at least of a photoconductive layer formed by depositing a thin p+-type layer, a p-type layer and n-type layer in succession on said n-type transparent electrode layeer, and a block layer formed on said photoconductive layer for blocking an electron beam emitted from said cathode passing through said photoconductive layer; a metal mesh disposed in the vicinity of the side of said photoconductive target which is scanned by said electron beam; and a collector electrode disposed between said metal mesh and said cathode for collecting secondary electrons emitted from said photoconductive target, whereby said photoconductive target is scanned by said electron beam emitted from said cathode, said camera tube circuit comprising:

means for connecting said n-type transparent electrode to a preamplifier and the negative terminal of a target voltage source;

a capacitor connected between said metal mesh and said target, said capacitor maintaining the potential of said metal mesh substantially at a constant level; and means for connecting said metal mesh to the positive terminal of said target voltage source through a series circuit, said series circuit comprising a resistive means having a resistance which is sufficiently larger than the input impedance of said preamplifier and switching means which is in the off condition only during a blanking period of the scanning effected by said electron beam, whereby a camera output is derived from said preamplifier.

18. A camera tube circuit as claimed in claim 17, wherein said switching means comprises one of a field effect transistor, a MOS-type field effect transistor and a vacuum tube, a blanking pulse being applied to a controlling electrode of said switching means.

19. A camera tube circuit as claimed in claim 17, wherein said switching means comprises a diode connected in series with said capacitor, the polarity of said diode being arranged to block discharge of said capacitor during the blanking period of said scanning.

20. A camera tube circuit as claimed in claim 17, wherein said switching means comprises a resistor connected between said resistive means and the positive terminal of said target voltage source, said resistor having a resistance which is less than that of said resistive means;

a discharge blocking voltage source having a voltage equal to the voltage drop across said resistive means when a mesh current flows through said resistive means during scanning by said electron beam; and a switch coupling said discharge blanking voltage source across said resistor during said blanking period, the polarity of said discharge blocking voltage source being selected so that discharge from said capacitor is blocked during said blanking period.

21. A TV camera tube, comprising an envelope having an open end;

a glass faceplate positioned adjacent the open end of said envelope;

an electron gun for generating an electron beam located within said envelope, said electron gun including a cathode positioned at the end of said envelope opposite said faceplate;

an n-type transparent electrode layer formed on the surface of said glass faceplate facing said cathode;

a photoconductive target including a photoconductive layer comprising a p+-type layer deposited on said n-type transparent electrode layer, a p-type layer deposited on said p+-type layer and an n-type layer deposited on said p-type layer; and a blocking layer formed on the p-type layer of said photocathode layer, said blocking layer absorbing a portion of the energy in said electron beam inpinging on said photoconductive layer;

a metal mesh positioned adjacent said blocking layer;

a collector electrode disposed within said envelope between said metal mesh and cathode for collecting secondary electrons emitted from said photoconductive target;

a mesh rack positioned on said collector electrode;

an insulating ring covering said mesh rack, said insulating ring having a skirted portion on which said metal mesh is supported;

a metallic ring interposed between the open end of said envelope and said glass faceplate;

a conductive gum sheet interposed between said glass faceplate and said faceplate holder; and an electrically conductive pin embedded within said glass faceplate connecting said n-type transparent electrode to said conductive gum sheet for measuring the capacitance between said transparent electrode and said metallic ring.

22. A camera tube as claimed in claim 21, wherein said insulating ring is composed of Teflon, said metallic ring is composed of indium, and wherein said glass-envelope is vacuum-sealed by crushing said metallic ring under pressure, said pressure being obtained by pressing said glass faceplate toward said metal mesh to bring the inside of said crushed metallic ring into contact with said metal mesh.

* * * * *